US008199513B2

(12) United States Patent  (10) Patent No.: US 8,199,513 B2
Benedetto et al.  (45) Date of Patent: Jun. 12, 2012

(54) LINE MODULE FOR TELECOMMUNICATION AND DATA ENGINEERING

(75) Inventors: Adrian Benedetto, Berlin (DE); Harald Klein, Berlin (DE)

(73) Assignee: ADC GmbH, Berlin (DE)

( * ) Notice: Subject to any disclaimer, the term of this patent is extended or adjusted under 35 U.S.C. 154(b) by 17 days.

(21) Appl. No.: 12/668,371

(22) PCT Filed: Jun. 24, 2008

(86) PCT No.: PCT/EP2008/005073
§ 371 (c)(1),
(2), (4) Date: Jan. 8, 2010

(87) PCT Pub. No.: WO2009/007001
PCT Pub. Date: Jan. 15, 2009

(65) Prior Publication Data
US 2010/0188824 A1  Jul. 29, 2010

(30) Foreign Application Priority Data
Jul. 9, 2007  (DE) .................. 10 2007 032 578

(51) Int. Cl.
*H05K 7/00* (2006.01)

(52) U.S. Cl. .................. 361/747; 361/756; 361/801

(58) Field of Classification Search .................. 361/747, 361/756, 801–803
See application file for complete search history.

(56) References Cited

U.S. PATENT DOCUMENTS

| 4,674,722 | A | 6/1987 | Danby et al. |
| 5,169,106 | A | 12/1992 | Rasmussen |
| 5,325,270 | A | 6/1994 | Wenger |
| 5,332,184 | A | 7/1994 | Davis |
| 5,351,922 | A | 10/1994 | Lindsay |
| 5,600,542 | A | 2/1997 | Malgouries |
| 5,779,207 | A | 7/1998 | Danby |
| 5,800,215 | A | 9/1998 | Dohnke et al. |
| 6,015,128 | A | 1/2000 | Lombardi |
| 6,171,120 | B1 * | 1/2001 | Bolich et al. .................. 439/157 |
| 6,382,576 | B1 | 5/2002 | Heimbrock |
| 6,955,550 | B2 | 10/2005 | Schlack |
| 7,037,118 | B2 | 5/2006 | Neumetzler et al. |
| 7,059,864 | B2 | 6/2006 | Matthies et al. |
| 7,380,761 | B2 | 6/2008 | Shillington |
| 7,407,389 | B2 | 8/2008 | Busse et al. |
| 7,548,434 | B2 | 6/2009 | Busse et al. |
| 7,556,616 | B2 | 7/2009 | Fathallah et al. |
| 7,618,261 | B2 | 11/2009 | Busse et al. |
| 2006/0023430 | A1 | 2/2006 | Karstens |
| 2006/0114660 | A1 | 6/2006 | Busse et al. |
| 2006/0231714 | A1 | 10/2006 | Crain et al. |
| 2006/0286824 | A1 | 12/2006 | Busse et al. |
| 2007/0086709 | A1 | 4/2007 | Nijhuis |

(Continued)

FOREIGN PATENT DOCUMENTS

AT  1 262 383  5/1965

(Continued)

*Primary Examiner* — Yuriy Semenenko
*Assistant Examiner* — Andargie M Aychillhum
(74) *Attorney, Agent, or Firm* — Merchant & Gould P.C.

(57) ABSTRACT

The invention relates to a line module for telecommunication and data engineering, comprising a housing (10) and at least one mounting means, wherein the mounting means is in the form of at least one lever (19) with a hook-like element (63) which can be swivelled via a pivot bearing (30).

16 Claims, 6 Drawing Sheets

U.S. PATENT DOCUMENTS

| | | |
|---|---|---|
| 2007/0241149 A1 | 10/2007 | Bhavnani |
| 2009/0011633 A1 | 1/2009 | Busse et al. |
| 2009/0029588 A1 | 1/2009 | Neumetzler et al. |
| 2010/0190358 A1 | 7/2010 | Benedetto et al. |
| 2010/0195818 A1 | 8/2010 | Benedetto et al. |
| 2010/0252702 A1 | 10/2010 | Spang, Jr. et al. |

FOREIGN PATENT DOCUMENTS

| | | |
|---|---|---|
| DE | 1 262 383 | 5/1965 |
| DE | 30 03 634 | 7/1981 |
| DE | 39 12 951 | 10/1990 |
| DE | 93 101 55 | 9/1993 |
| DE | 93 101 55.4 | 9/1993 |
| DE | 100 43 723 | 3/2002 |
| DE | 102 36 361 | 3/2004 |
| DE | 103 39 844 | 1/2005 |
| DE | 103 41 694 | 2/2005 |
| DE | 10 2004 017 605 | 10/2005 |
| DE | 10 2004 043 764 | 2/2006 |
| EP | 0 491 245 | 12/1991 |
| EP | 1 245 765 | 10/2002 |
| FR | EP 0 681 421 | 11/1995 |
| GB | 2 264 197 | 8/1993 |
| WO | WO 03/079644 | 9/2003 |
| WO | WO 2004/008589 | 1/2004 |
| WO | WO 2005/060274 | 6/2005 |

\* cited by examiner

LINE MODULE FOR TELECOMMUNICATION AND DATA ENGINEERING

This application is a National Stage Application of PCT/EP2008/005073, filed 24 Jun. 2008, which claims benefit of Serial No. 10 2007 032 578.0, filed 9 Jul. 2007 in Germany and which applications are incorporated herein by reference. To the extent appropriate, a claim of priority is made to each of the above disclosed applications.

BACKGROUND

The invention relates to a line module for telecommunication and data engineering, comprising a housing and at least one attachment means.

In existing copper telecommunication networks, the access network is constructed as radial network in most cases. In this network configuration, the main cables are brought out of the switching office and distributed to the various cable distributors of the corresponding subscriber regions. The main cable is distributed to the various cable distributors via cable sleeves. From the cable sleeves, the distributed main cables then go to the cable distributors where they are connected to terminal heads and are run as distribution cables in the respective streets of the subscribers. The connection to the terminal distribution box of the subscriber is then made in most cases by means of a sleeve in the distribution cable. Due to this fanning out of the network towards the subscriber, the connection of the main cables at the subscriber or line side at the main distributor is the only location in the access network where all connections (lines) run together in space and can be centrally tested. The number of terminal heads in a cable distributor is dependent on the type of construction of the cable distributor, but a typical value is about 12 terminal heads per cable distributor.

A terminal head consists, for example, of a mounting or receiving shell for 10 terminal strips which, in turn can in each case connect 10 pairs. Thus, 100 pairs can be connected by means of one terminal head. The receiving shell is then preferably hooked into the cable distributor rack with preassembled clamping nuts, and the clamping nuts then snap in behind the rack rails. The receiving shell is then clamped by tightening fitting screws and a ground connection is made.

The rack rails can be dimensioned in length in such a manner that a number of terminal heads can snap in (for example three), or can be designed for only one terminal head.

From DE 10 2004 017 605 A1, a connector for circuit boards is known comprising a number of contact elements, the contact elements in each case having two connecting sides, one connecting side being constructed as insulation displacement contact for connecting wires and the other connecting side being constructed as forked contact for contacting terminal areas on the circuit board.

SUMMARY

The invention is based on the technical problem of creating a line module which can be arranged on carrier rails in a space-saving manner.

For this purpose, the attachment means is constructed as at least one lever having a hook-shaped element which can be pivoted via a rotating bearing. As a result, the hook-shaped element can engage behind an arm of the carrier system and attach the line module to the carrier system.

In a preferred embodiment, the lever is arranged on a top part and/or a bottom part of the housing via the rotating bearing, the lever also preferably being constructed to be flat and level and being pivoted in a plane parallel to the top part and/or bottom part so that only little space is needed above and below the line module for moving the lever.

In a further preferred embodiment, two levers are in each case arranged on the top part and/or the bottom part. This results in uniform force distribution.

In a further preferred embodiment, an excentric bend of the lever, at which the hook-shaped element is arranged, projects from the rotating bearing.

In a further preferred embodiment, the top part and/or the bottom part has protruding parts in relation to side parts, the rotating bearing being arranged on the protruding part, the protruding parts being preferably located at the rear of the housing.

Further preferably, the line module is constructed as terminal head. In principle, the line module can also be a line module for copper wires or glass fibers.

BRIEF DESCRIPTION OF THE DRAWINGS

In the text which follows, the invention will be explained in greater detail with reference to a preferred exemplary embodiment. The figures show in.

DETAILED DESCRIPTION

Figure 1:
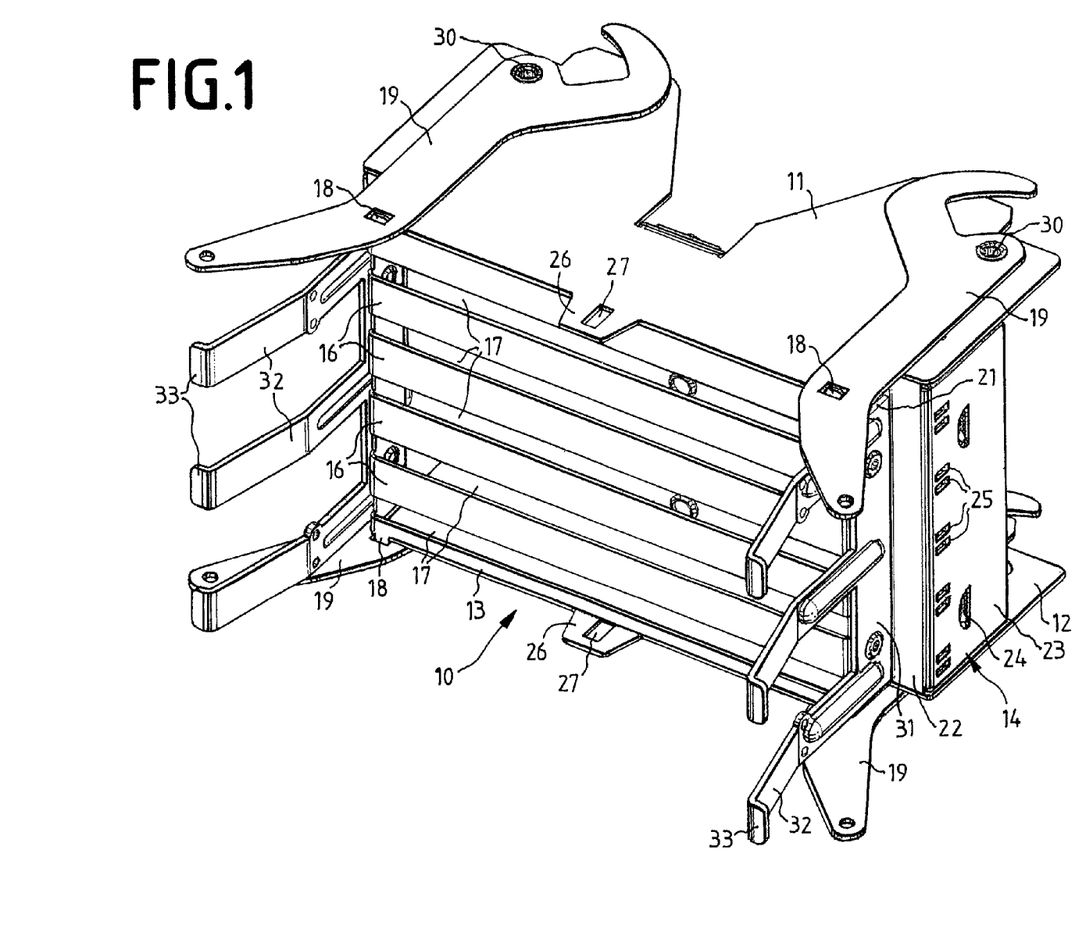
FIG. 1 a perspective front view of an unequipped housing of a terminal head.
Figure 2:
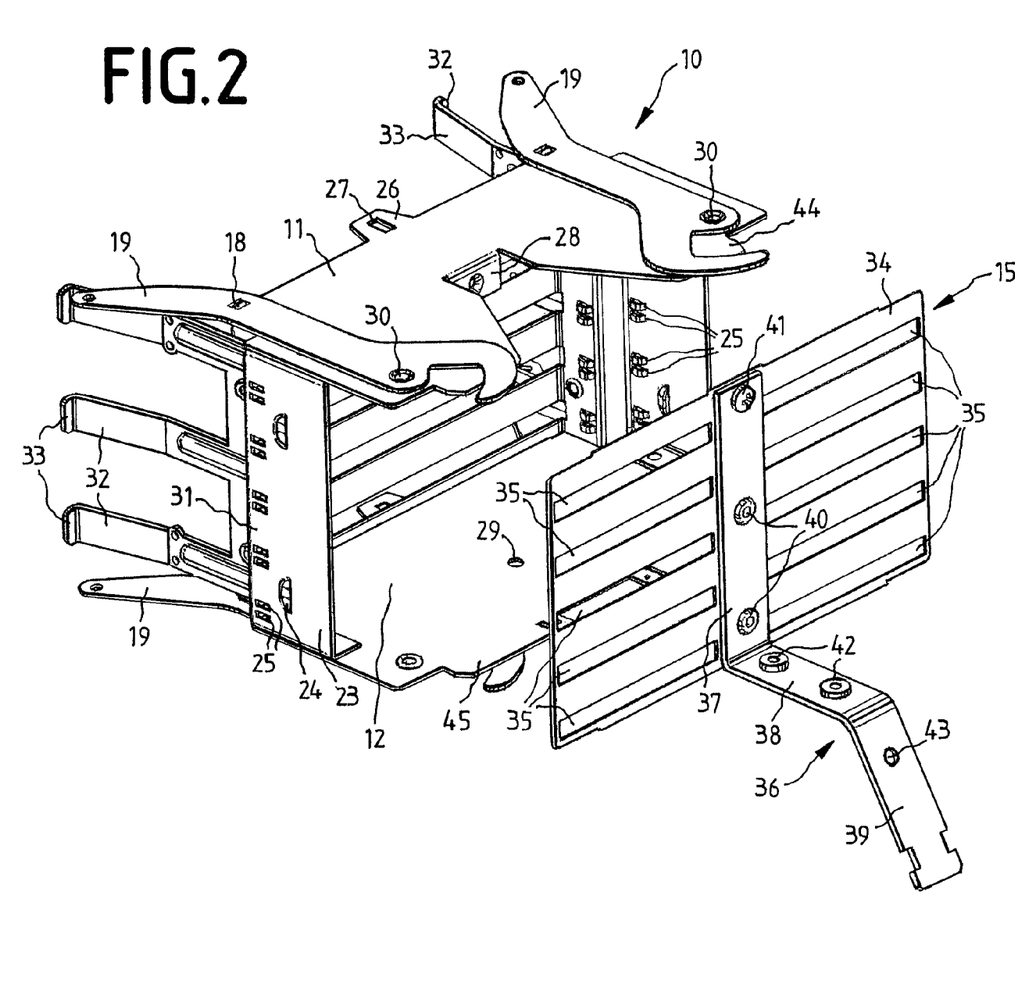
FIG. 2 shows a perspective rear view of an unequipped housing with the rear wall removed.
Figure 3:
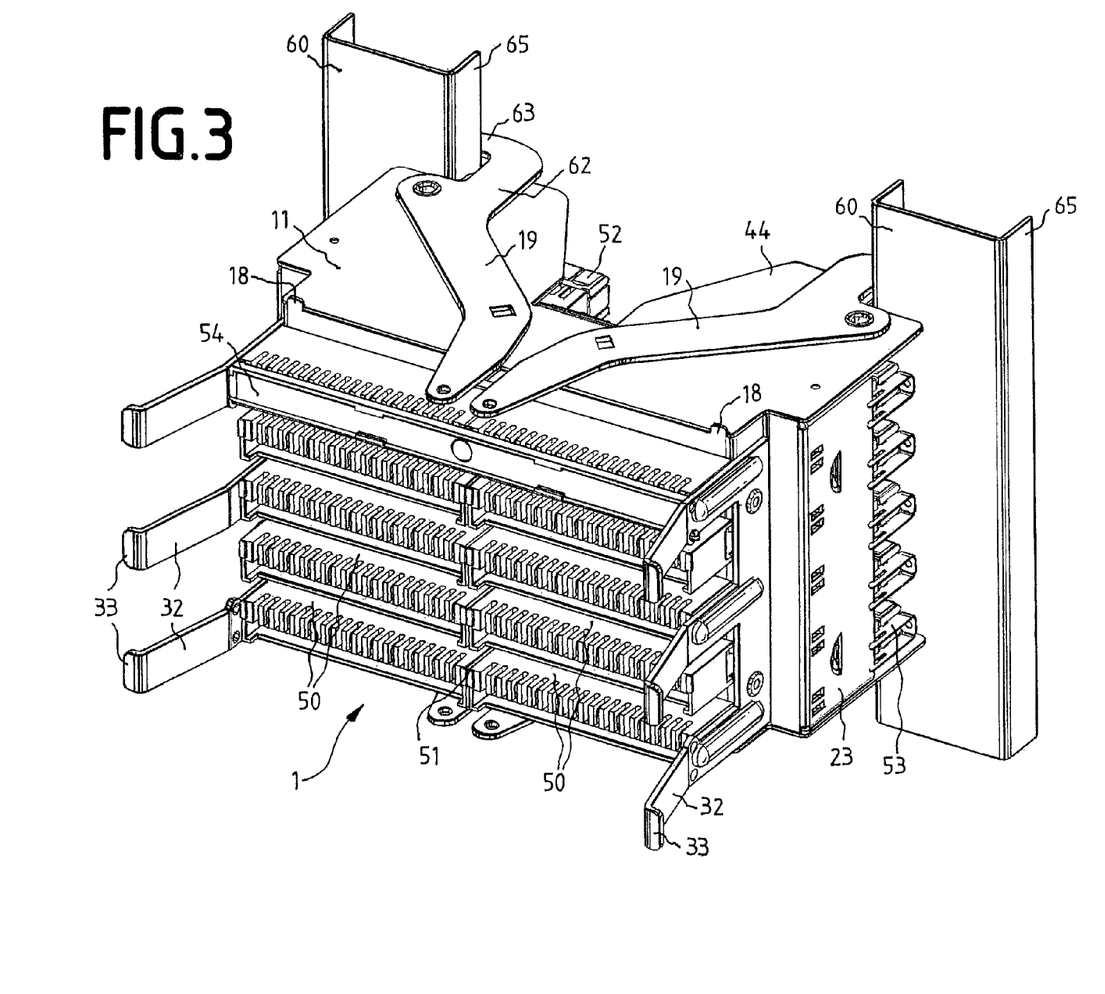
FIG. 3 shows a perspective front view of a fully equipped housing.
Figure 5:
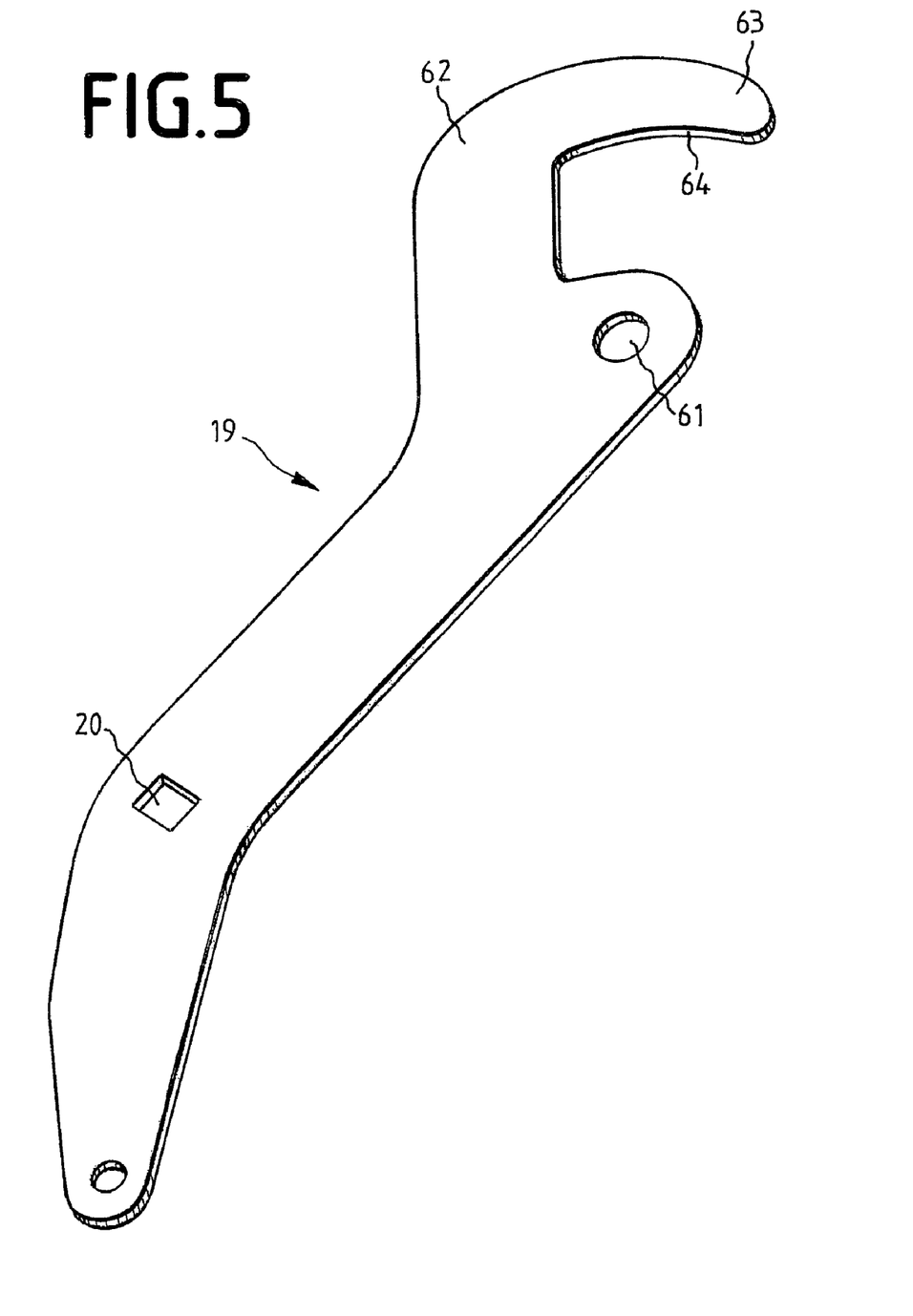
FIG. 5 shows a top view of a lever.

FIG. 1 shows a housing 10 of a terminal head 1 (see FIG. 3). The housing 10 comprises a top part 11, a bottom part 12, a front part 13, two side parts 14 and a rear wall 15 (see FIG. 2). The top part 11, the bottom part 12, the front part 13 and the two side parts 14 are preferably permanently connected to one another, for example riveted. The front part 13 has six horizontal metal rails 16 between which five slots 17 are formed for inserting circuit board connectors. The lowermost metal rail 16 is slightly narrower than a top metal rail 16. From the topmost metal rail 16 and from the lowermost metal rail 16, two lugs 18 protrude in each case which are used as stopping means for levers 19, arranged at the top part 11 and at the bottom part 12, respectively, which engage openings 20 of the levers 19 (see FIG. 5). The side parts 14 are constructed to be stepped in width. A first part piece 21 adjoins the front part 13, from which part piece a second part piece 22, angled towards the outside at right angles, protrudes from which a third part piece 23 protrudes which protrudes at right angles from the second part piece 22, the third part piece 23 extending towards the rear wall 15 and being arranged in parallel with the first part piece 21. The third part piece 23 is constructed with inwardly bent punched openings 24 and with inwardly bent roundings 25, a circuit board 70 (see FIG. 6) being guided in each case between two roundings 25. The upper part 11 and the lower part 12 are in each case finished flush with the front part 13, wherein in each case a lug 26 with an opening 27 protrudes at the center, at which a covering hood can be attached. The upper part 11 and the lower part 12 are longer than the side parts 14, the upper part 11 having centrally a pot-shaped cutout at the end of which a lug 28 with thread is arranged which is bent perpendicularly downward (see FIG. 2). The lower part also has two openings 29, one opening 29 being covered in FIG. 2. On the parts 44, 45, protruding over the side parts 14, of the upper part 11 and the lower part 12, respectively, rotating bearings 30 for the levers 19 are arranged, wherein the protruding parts 44, 45 are used at the same time as support area for the levers 19. At the first part piece 21 of the side parts 14, wire guides 31 with in each case three outwardly bent fingers 32 are arranged at the end of which in each case a bend 33 is arranged. The rear wall comprises a plate 34 in which ten slots 35 are inserted. At the rear wall 15, a lug 36 is attached which has three legs 37-39. The leg 37 is arranged centrally over the entire height at the rear wall 15. At the lower side of the leg 37, the leg 38 protrudes at a right angle, from which the leg 39 then protrudes obliquely downward. The lug 36 is permanently connected to the rear wall 15 via rivet connections 40, the rear wall 15 being screwed to the lug 28 via a screw 41. Furthermore, the leg 38 is screwed to the lower part 12 through the openings 29, only the nuts 42 of the screw connection being visible in FIG. 2. The leg 37 divides the rear wall 15 so that in each case five slits 35 are arranged on the left-hand side of the leg 37 and in each case five slots 35 are arranged on the right-hand side of the leg 37. One slot 35 in each case on the left and on the right form one, pair and are exactly opposite a slot 17 on the front. The leg 39 is used for attaching a cable, whereas the wires of the cable run to the circuit board connectors 50 are attached to the leg 37. For this purpose, the leg 39 has a hole 43. The cable jacket is cut in and provided with holes, plastic tape being wound around the exposed cable core and the remaining cable jacket. Through the hole 43 and the holes in the cable jacket, a mushroom head screw is then inserted, tape is wound again around the cable end and the screw is tightened by a nut. In cables with shielding, this is grounded via the screw, preferably also using a metal contacting plate with teeth between screw and shielding for this purpose.

Figure 4:
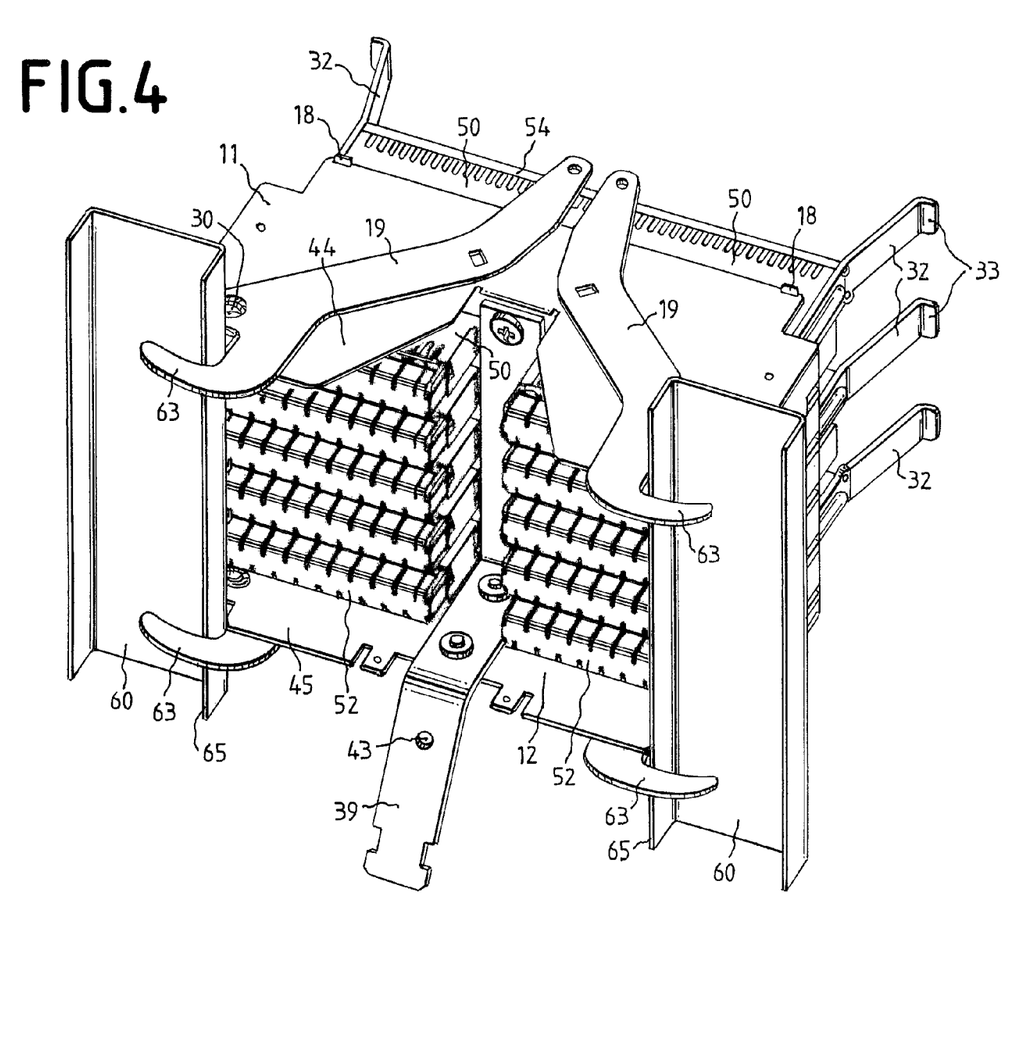
FIG. 4 shows a perspective rear view of the fully equipped housing.

To equip the housing 10, five circuit boards 70 are inserted into the housing 10 from the rear, the circuit boards 70 in each case being guided between two roundings 25 on the left-hand and right-hand side part 14. Following this, the rear wall 15 is screwed on, the punched cutouts 24 forming stops for the rear wall 15 so that it is prevented that the rear wall 15 is pushed inward when the circuit boards are equipped with the circuit board connectors 50, and in each case ten circuit board connectors 50 are inserted on the circuit boards from the front and the rear of the housing 10. In this arrangement, the circuit board connectors 50 of the front are scarcely spaced apart whereas the circuit board connectors 50 of a row of the rear are separated by the leg 37 which is why the housing 10 is also wider at the rear than at the front. So that the circuit board connectors 50 can pass the circuit boards 70 with their housing edges, they have cut-ins 74, 77, 78 (see FIG. 6) for the inwardly pointing side walls 51 of the circuit board connectors 50. The circuit board connectors 50 of the rear are equipped with arrester magazines 52 which, for example, are plugged into break contacts of the circuit board connectors 50, ground contacts constructed as double-forked contacts 53 of the arrester magazines 52 being pushed onto the front faces of the part pieces 23. Furthermore, it is shown in FIGS. 3 and 4 how the levers 19 are pivoted into an attachment position at carriers 60. The carriers 60 are constructed to be U-shaped in cross section. The lever has an opening 61 for the rotating bearing 30. Furthermore, the lever 19 has an excentric bend 62 at which a hook-shaped element 63 is arranged, the inside edge 64 of the hook-shaped element 63 being rounded. The hooked-shaped elements 63 of the four levers 19 engage the attachment position behind a leg 65 of a carrier 60 in each case and hold the terminal head 1 fixed on the carriers 60. In FIGS. 3 and 4, the two top circuit board connectors 50 of the front are covered with a label frame 54.

Each circuit board connector 50 can terminate ten pairs so that 100 pairs can be connected at the front and 100 pairs can be connected at the rear, that is to say a total of 200 pairs. However, the constructional height of the terminal head 1 is only half as high as that of a conventional terminal head. Since the terminal head 1 only covers less than one half of the width of the carrier, a further terminal head 1 can be easily arranged on the left and on the right so that, as a result, the terminal density is doubled. The correlation between the contacts of the circuit board connectors from the front to the rear is such that in each case one circuit board connector 50 of the front is connected to the circuit board connector 50 of the rear which is almost exactly opposite to it (almost because of the offset due to the leg 37), the almost opposite contacts in each case being connected to one another.

Figure 6:
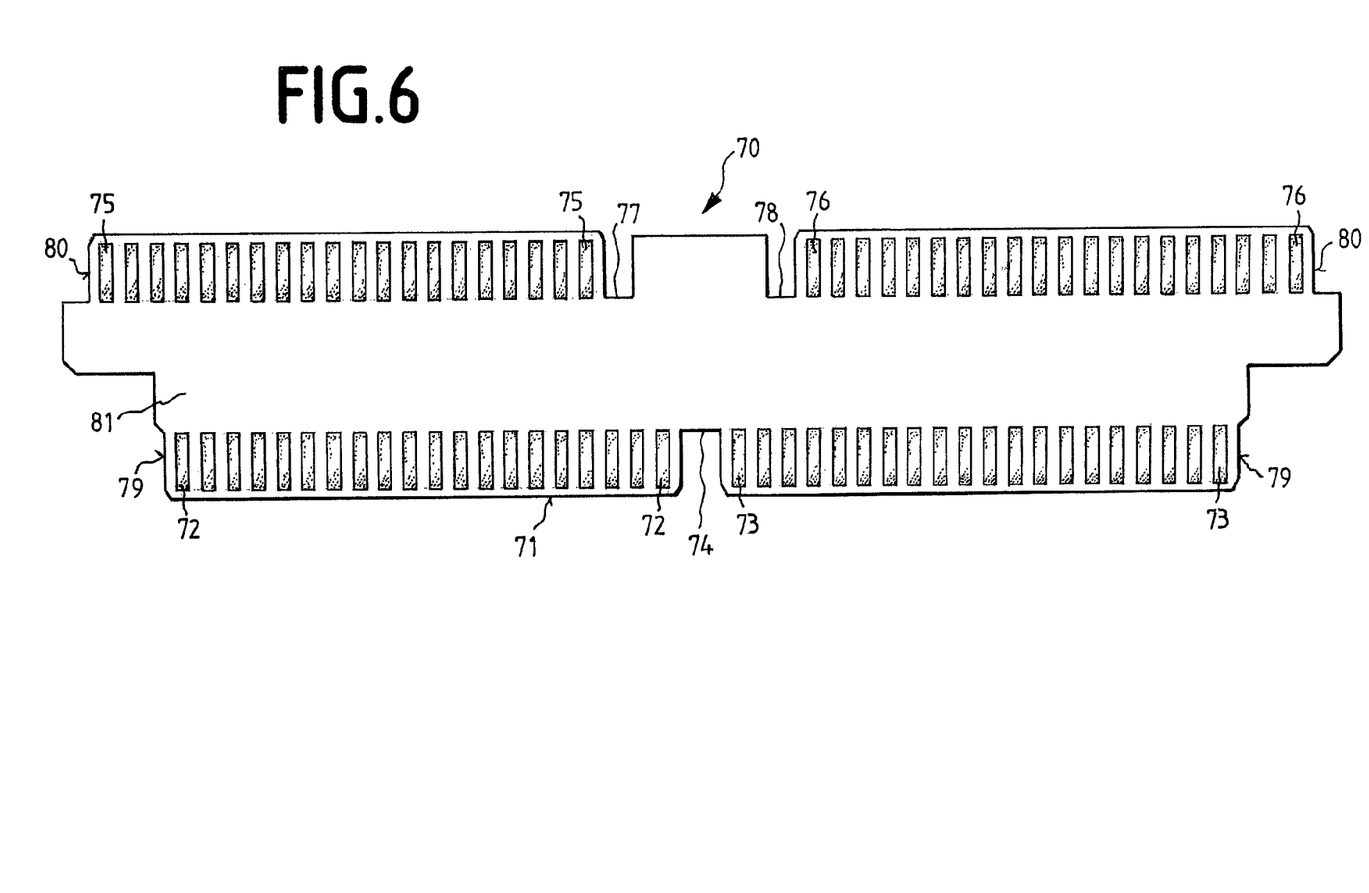
FIG. 6 shows a diagrammatic top view of a circuit board.

FIG. 6 shows a diagrammatic top view of a circuit board 70. In the area of the front end face 71, twenty contact pads 72 are arranged on the left and twenty contact pads 73 are arranged on the right for the two front circuit board connectors 50 which are inserted into the slot 17. In this arrangement, the circuit board 70 has a first cut-in 74 so that the right-hand side wall 51 of the left-hand circuit board connector 50 and the left-hand side wall 51 of the right-hand circuit board connector 50 can slide past on the circuit board 70, the terminal contacts, preferably constructed as forked contacts, for the circuit board 70 preferably contacting the contact pads 72, 73. Since the two circuit board connectors 50 are arranged directly adjacently to one another at the front, one cut-in 74 is sufficient. At the rear, contact pads 75, 76 are correspondingly arranged for the circuit board connectors 50 of the rear 15. In this arrangement, the circuit board has two cut-ins 77, 78 since the two circuit board connectors 50 are arranged farther apart from one another. Laterally, the circuit board 50 is adapted to the shape of the side parts 14, the edges 79, 80 being offset towards the inside at the front and the rear so that the other side walls 51 of the circuit board connectors 50 can slide past the circuit board 70. The contact pads 72, 73, 75, 76 are preferably arranged at the top 81 and the bottom of the circuit board 70. The conductor runs between in each case one contact pad 72, 73 of the front and one contact pad 75, 76 at the rear are not shown. The conductor runs can be constructed uncrossed or crossed. To compensate for cross talk, the capacitive coupling between the layers of a multi-layer board as circuit board can also be utilized in supplementary fashion or as an alternative to crossing the conductor runs.

LIST OF REFERENCE DESIGNATIONS

1 Terminal head
10 Housing
11 Top part
12 Bottom part
13 Front part
14 Side part
15 Rear wall
16 Metal rails
17 Slots
18 Lugs
19 Levers
20 Openings
21 First part piece 22 Second part piece
23 Third part piece
24 Bent cutout
25 Roundings
26 Lug
27 Opening
28 Lug
29 Openings
30 Rotating bearing
31 Wire guides
32 Finger
33 Bend
34 Plate
35 Slots
36 Lug
37-39 Leg
40 Riveted connections
41 Screw
42 Nuts
43 Hole
44 Protruding part (top part)
45 Protruding part (bottom part)
50 Circuit board connector
51 Side walls
52 Arrester magazine
53 Forked contact
54 Label frame
60 Carrier
61 Opening
62 Bend
63 Hook-shaped element
64 Inside edge
65 Leg
70 Circuit board
71 Front face
72 Contact pad
73 Contact pad
74 Cut-in
75 Contact pad
76 Contact pad
77 Cut-in
78 Cut-in
79 Edge
80 Edge
80 Top

The invention claimed is:

1. A line module for telecommunication and data engineering, comprising
a housing having a front, a rear, a top part, and a bottom part, a first side, and a second side defining an interior, the front of the housing being configured to receive a first connector and the rear of the housing being configured to receive a second connector; and
at least one attachment arm coupled to the housing, wherein the attachment arm is constructed as a unitary piece to have at least one lever section at one end and a hooking section at an opposite end, the lever section extending forwardly past the front of the housing, the hooking section having a hook-shaped element that extends rearwardly past the rear of the housing, the hook-shaped element being configured to be pivoted via a rotating bearing about an axis extending between the top and bottom of the housing.

2. The line module as claimed in claim 1, wherein the arm lever is arranged on the top part of the housing via the rotating bearing.

3. The line module as claimed in claim 2, wherein two arms are arranged on the top part.

4. The line module as claimed in claim 2, wherein the top part has protruding parts that extend past the first and second sides of the housing, the rotating bearing being arranged on one of the protruding parts.

5. The line module as claimed in claim 1, wherein the hooking section defines an eccentric bend, at which the hook-shaped element is arranged, projecting from the rotating bearing.

6. The line module as claimed in claim 1, wherein the line module is constructed as a terminal head.

7. The line module as claimed in claim 1, wherein the attachment arm is arranged on the bottom part of the housing via the rotating bearing.

8. The line module as claimed in claim 7, wherein the bottom part has protruding parts that extend past the first and second sides of the housing, the rotating bearing being arranged on one of the protruding parts.

9. The line module as claimed in claim 7, wherein a second attachment arm also is disposed at the bottom part of the housing, the second attachment arm being spaced from the first attachment arm.

10. The line module as claimed in claim 9, wherein two additional attachment arms are disposed at the top part of the housing at the first and second sides of the housing, each attachment arm having a rotating bearing.

11. The line module as claimed in claim 10, wherein the top part has protruding parts that extend past the first and second sides of the housing, each of the rotating bearings being arranged on one of the protruding parts.

12. The line module as claimed in claim 1, wherein the hook-shaped element of the attachment arm is configured to mount a rail that extends along the axis about which the rotating bearing pivots.

13. The line module as claimed in claim 12, wherein the rail has a U-shaped transverse cross-sectional profile.

14. The line module as claimed in claim 1, wherein the attachment arm is configured to lock to the housing to hold the attachment arm stationary relative to the housing.

15. The line module as claimed in claim 14, wherein the attachment arm defines an aperture that receives a detent defined by the housing to lock the attachment arm to the housing.

16. The line module as claimed in claim 1, wherein the housing is configured to hold at least one circuit board to which the first and second connectors are connected.

* * * * *

UNITED STATES PATENT AND TRADEMARK OFFICE
CERTIFICATE OF CORRECTION

PATENT NO. : 8,199,513 B2  Page 1 of 1
APPLICATION NO. : 12/668371
DATED : June 12, 2012
INVENTOR(S) : Benedetto et al.

It is certified that error appears in the above-identified patent and that said Letters Patent is hereby corrected as shown below:

Col. 5, line 45: "80 Top" should read --81 Top--

Col. 6, line 32, claim 9: "first attachment arm." should read --attachment arm.--

Col. 6, line 43, claim 12: "mount a rail that" should read --mount to a rail that--

Signed and Sealed this
Second Day of April, 2013

Teresa Stanek Rea
*Acting Director of the United States Patent and Trademark Office*